No. 733,371. PATENTED JULY 14, 1903.
D. CLINE.
COMBINED COOKING STOVE AND STEAM GENERATOR.
APPLICATION FILED APR. 30, 1902.
NO MODEL. 4 SHEETS—SHEET 1.

David Cline, Inventor

Witnesses
Attorney

No. 733,371. PATENTED JULY 14, 1903.
D. CLINE.
COMBINED COOKING STOVE AND STEAM GENERATOR.
APPLICATION FILED APR. 30, 1902.
NO MODEL. 4 SHEETS—SHEET 2.
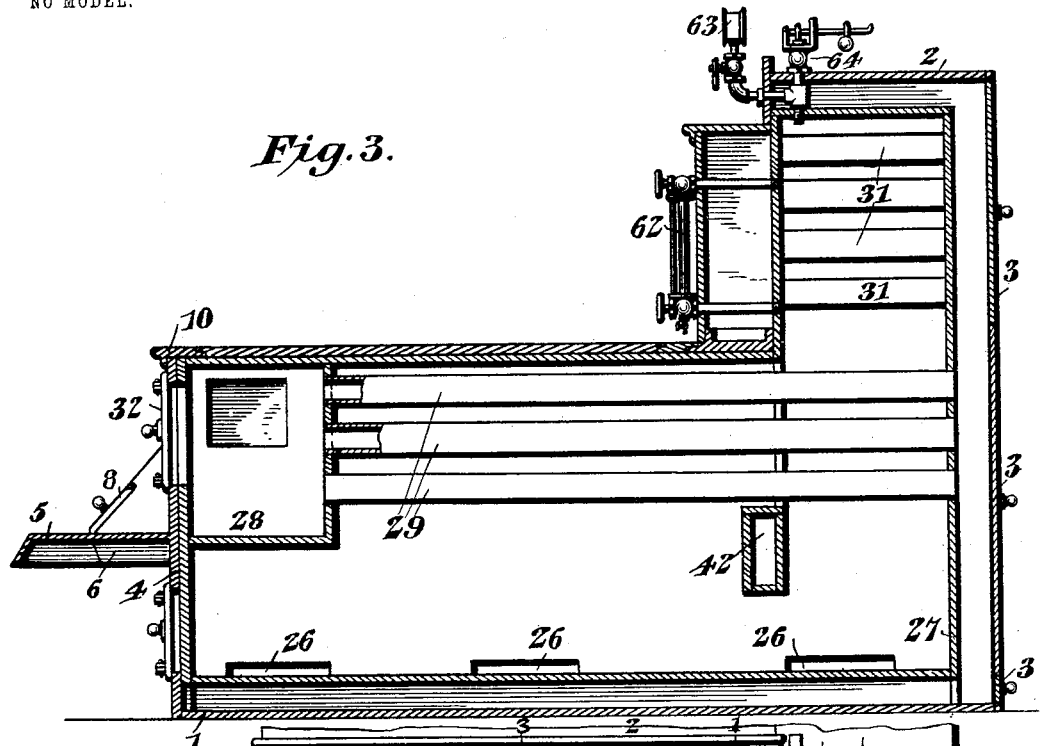
Fig. 3.
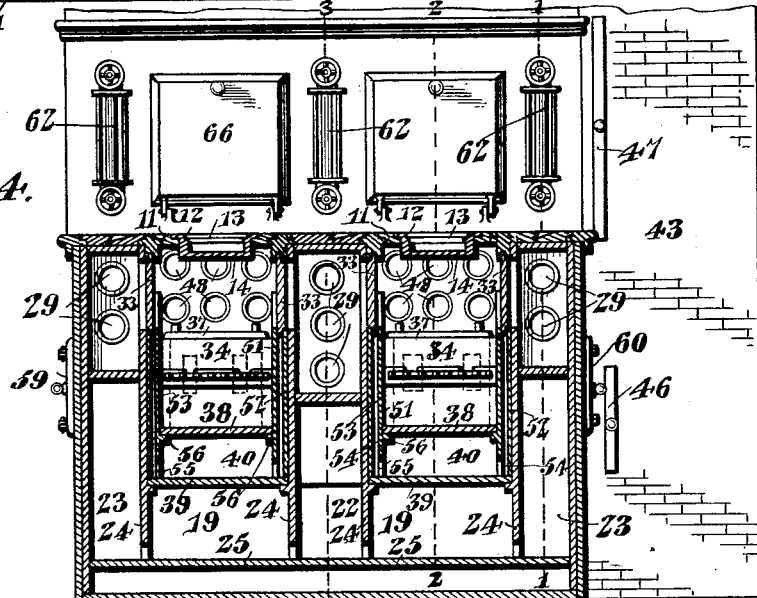
Fig. 4.

No. 733,371. PATENTED JULY 14, 1903.
D. CLINE.
COMBINED COOKING STOVE AND STEAM GENERATOR.
APPLICATION FILED APR. 30, 1902.
NO MODEL. 4 SHEETS—SHEET 3.

David Cline, Inventor

Witnesses

No. 733,371. PATENTED JULY 14, 1903.
D. CLINE.
COMBINED COOKING STOVE AND STEAM GENERATOR.
APPLICATION FILED APR. 30, 1902.
NO MODEL. 4 SHEETS—SHEET 4.
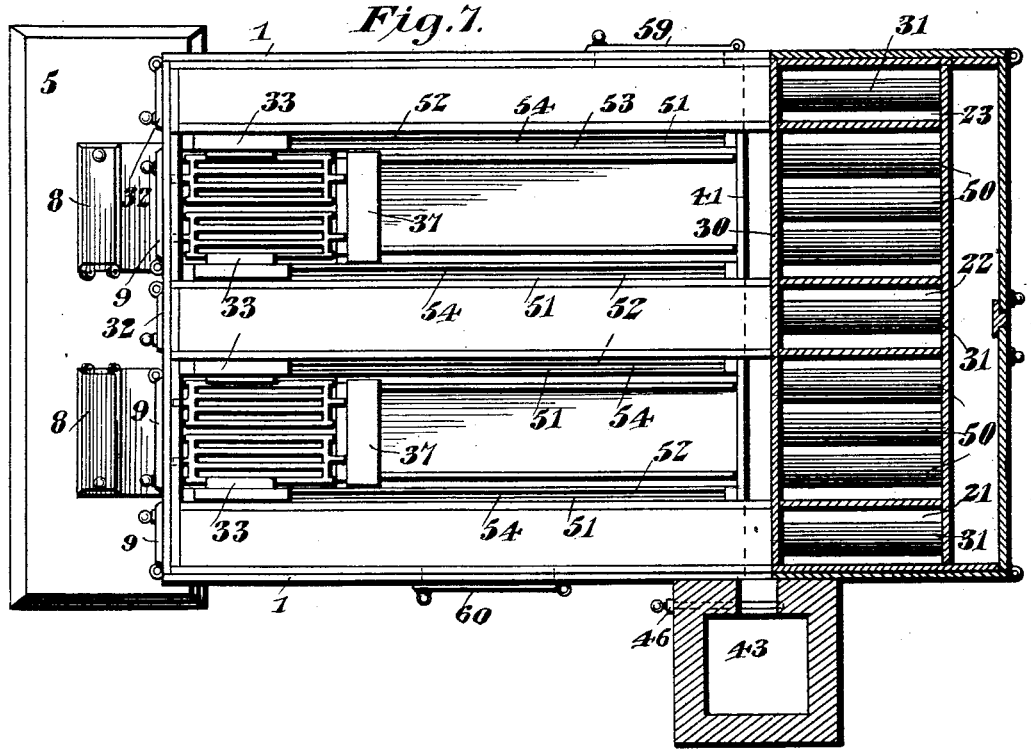
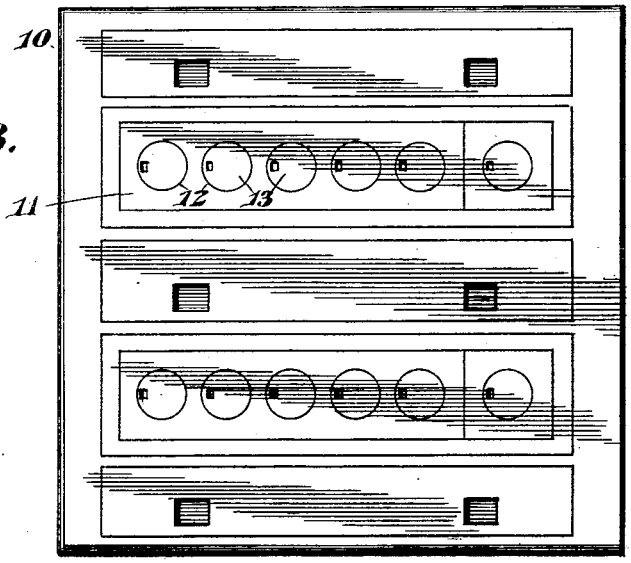
David Cline, Inventor
Witnesses No. 733,371. Patented July 14, 1903.

UNITED STATES PATENT OFFICE.

DAVID CLINE, OF WATSONTOWN, PENNSYLVANIA.

COMBINED COOKING-STOVE AND STEAM-GENERATOR.

SPECIFICATION forming part of Letters Patent No. 733,371, dated July 14, 1903.

Application filed April 30, 1902. Serial No. 105,340. (No model.)

*To all whom it may concern:*

Be it known that I, DAVID CLINE, a citizen of the United States, residing at Watsontown, in the county of Northumberland and State of Pennsylvania, have invented a new and useful Combined Cooking-Stove and Steam-Generator, of which the following is a specification.

This invention relates to a combined cooking-stove and steam-generator.

The object of the invention is to provide a cooking and heating apparatus combining the essentials of a cooking-stove and a steam-generator or hot-water heater of that class designed to supply steam or hot water to a heating system extending throughout the building.

A further object of the invention is to make such provision for the circulation of the products of combustion as will permit the device to be employed either exclusively for cooking purposes—as, for instance, in the summer—or for both cooking and heating in winter.

A still further object of the invention is to make special provision for baking by causing the products of combustion to circulate around the ovens in a manner to insure the uniform heating thereof.

Other objects of the invention and novel features of construction will be pointed out during the succeeding description of the illustrated embodiment of the invention.

Figure 1:
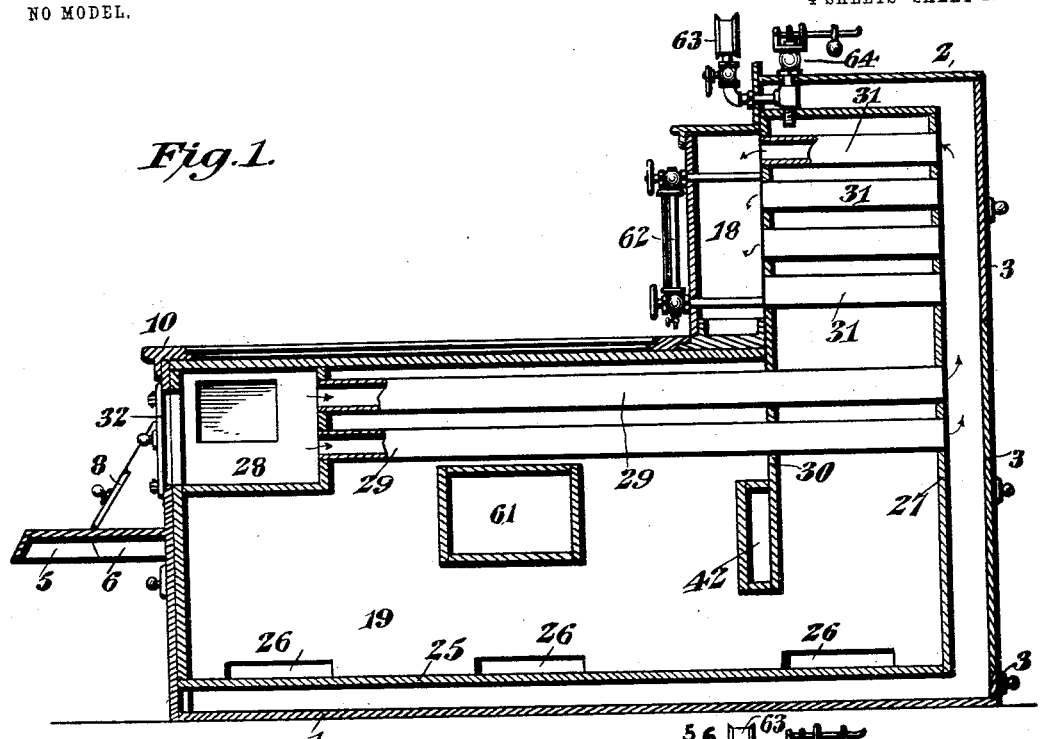
Figure 2:
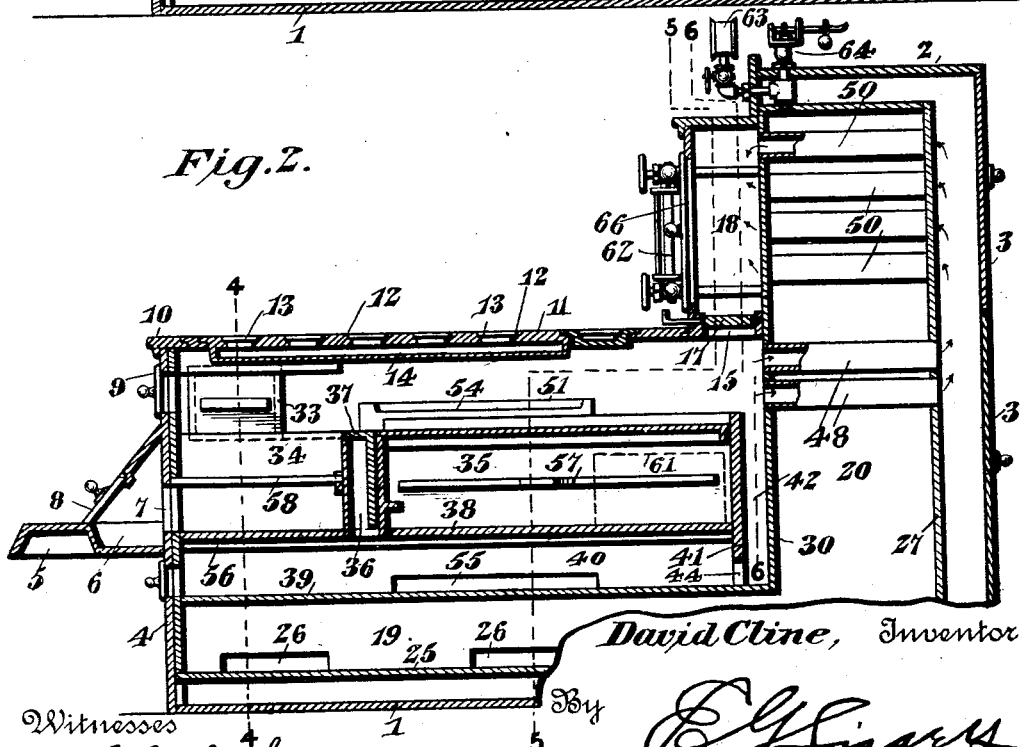
Figure 5:
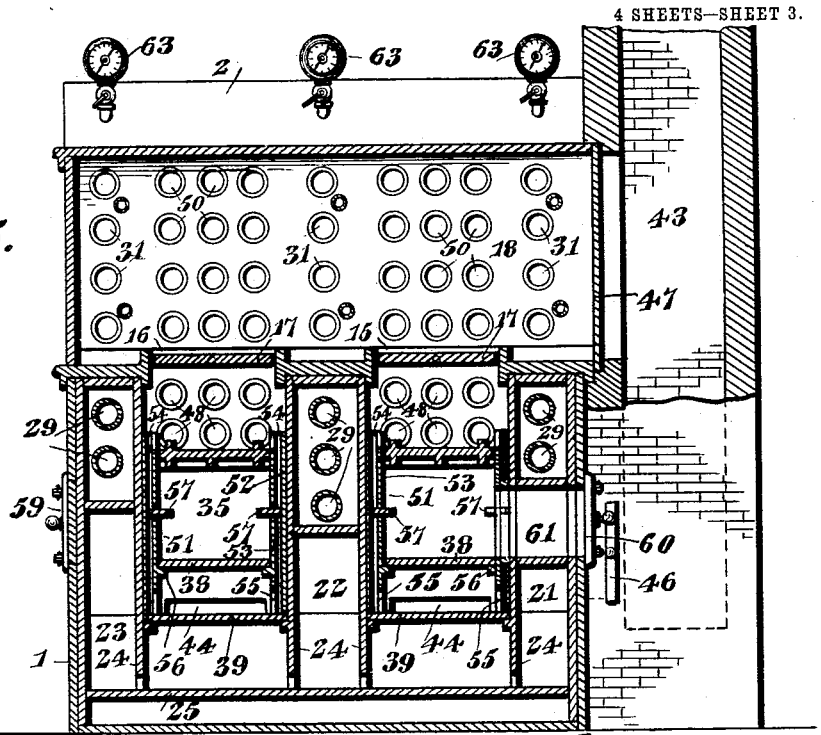
Figure 6:
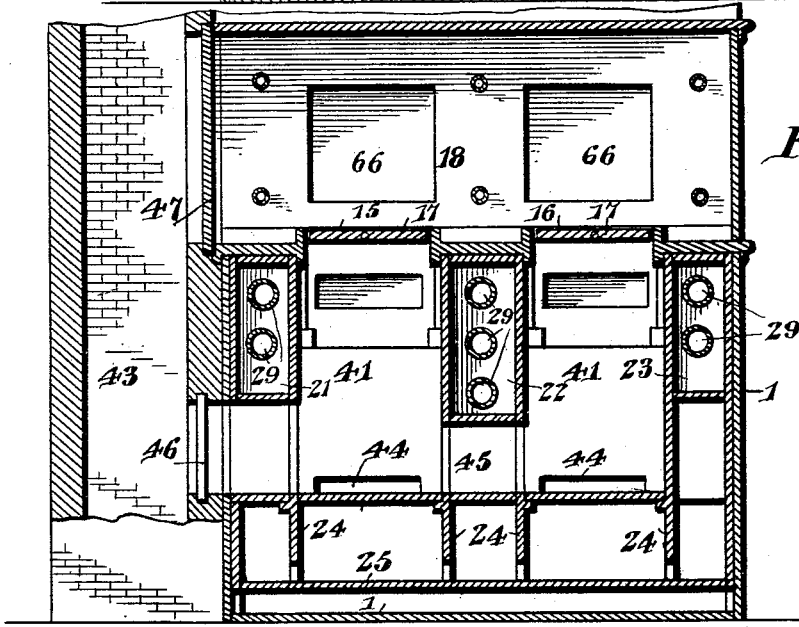

In the accompanying drawings, Figure 1 is a longitudinal section through the apparatus complete in the plane of the line 1 1 of Fig. 4. Fig. 2 is a similar view in the plane of the line 2 2 of Fig. 4. Fig. 3 is still another longitudinal sectional view in the plane of the line 3 3 of Fig. 4. Fig. 4 is a transverse sectional view on the line 4 4 of Fig. 2. Fig. 5 is a similar view on the line 5 5 of Fig. 2. Fig. 6 is still another transverse sectional view on the line 6 6 of Fig. 2. Fig. 7 is a plan view of the stove with the top wall of the stove proper removed and showing the upper end of the casing extension, the vertical boiler-chamber, and the chimney in section; and Fig. 8 is a detail plan view of the top wall of the stove with the top plates in place.

Like numerals of reference are employed to designate corresponding parts throughout the several views.

The structure comprehends the casing 1, having an upward extension 2 at its rear end and closed at the back by a plurality of doors 3, arranged in any desired manner to permit access to the interior of the casing for a purpose to be described. The front wall 4 is provided with a hearth 5, as usual, formed with ash-pits 6, arranged opposite draft-openings 7, access to the ash-pits being controlled by draft-doors 8. Adjacent to the top of the front wall the latter is provided with fuel-doors 9.

The top wall 10 of the casing is provided with a series of plates 11, closing corresponding openings in the top wall and each having a series of lid-holes 12, closed by lids 13 in the usual manner.

It should be understood that economy in the consumption of fuel is one of the objective points of the invention, and for this reason the apparatus is designed with special reference to the use of bituminous or soft coal. Coal of this grade, while inexpensive, produces a heavy soot, from contact with which I desire to protect the kettles or other cooking utensils supported over the holes 12. I therefore form the top plates 11 of the stove with a subjacent protective plate 14, running the full length of the top plates and preventing the smoke and soot from soiling the bottoms of the cooking utensils.

At the rear end of the main or forward portion of the casing the top wall is provided with openings 15 and 16, closed by swinging dampers 17, located at the bottom of a smoke-chamber 18, constituting the front of the casing extension 2.

Within the casing is inclosed a boiler of peculiar form. The shell of the boiler is constructed to define a comparatively shallow horizontal chamber 19, spaced from the bottom of the casing, a vertical chamber 20, disposed transversely of the casing at the rear end thereof, and three comparatively narrow longitudinally-disposed chambers 21, 22, and 23, rising from the horizontal chamber 19 to the top wall 10 of the casing and extending from the vertical chamber 20 to the front of the casing at the opposite sides and middle thereof, respectively, it being understood that the several chambers 19, 20, 21, 22, and 23 of the boiler are in communication and are designed to receive a body of water to be heated for the purpose of supplying a hot-water heating system or a steam-heating system, as the case may be. The side walls 24 of the longitudinally-disposed tube-chambers 21, 22, and 23 are extended downwardly, as indicated in Figs. 1 and 4, to the bottom wall 25 of the horizontal chamber 19, and are also extended into the vertical chamber 20 for the purpose of bracing the front and back walls thereof.

Inasmuch as the side walls 24 extend to the top and bottom and the full length of the boiler-shell, they are provided immediately above the bottom wall 25 with openings 26 to permit the free circulation of the water throughout the several compartments or chambers of the boiler. The upper portion of the vertical boiler-chamber 20 is extended upwardly into the casing extension 2, and the back wall 27 of said chamber is spaced from the back wall of the casing.

Within the front upper corner of each of the longitudinal chambers 21, 22, and 23 is formed a front smoke-chamber 28, into the rear wall of each of which are set the direct boiler-tubes 29, extended rearwardly within the tube-chambers and through the front wall 30 of the chamber 20 and having their rear ends set into the back wall 27 of said chamber. The reason for the spaced relation of the back walls of the boiler and casing will now be apparent, since it is evident that this space must be provided for the purpose of permitting the products of combustion escaping from the rear ends of the direct tubes 29 to enter the rear ends of the return-tubes 31, communicating with the smoke-chamber 18 and having their opposite ends set in the front and back walls 30 and 27 of the chamber 20 at a point above the stove proper—that is to say, above the plane of the top 10. By opening the appropriate back door 3 of the casing access may be had to any of the several sets of direct and return tubes of the boiler.

The smoke-chambers 28 have front doors 32, affording access thereto from the front of the casing for the purpose of cleaning the chambers or tubes, and are also equipped with sliding side doors 33 to control the passage of the products of combustion to the smoke chambers and flues in a manner to be made apparent. (See Figs. 1, 2, and 4.) The spaces between the tube-chambers 21, 22, and 23 and above the top of the chamber 19 are utilized for the fire-boxes 34 and the ovens 35, the latter being arranged in rear of the fire-boxes and separated therefrom by vertical flues 36, controlled by dampers 37.

The fire-box and oven in each compartment have a common bottom wall 38, spaced above the top wall 39 of the boiler-chamber 19, to define a horizontal flue 40. The rear end wall 41 of the oven rests upon the wall 39 and is in spaced relation to the front wall 30 of the vertical boiler-chamber 20 to form a smoke-passage 42, (see Fig. 2,) communicating at one end with the chimney 43, located beyond one side of the apparatus. The passage 42 is in communication with the flue 40 under the oven by reason of openings 44, formed in the rear oven-wall 41, and those portions of the passage 42 lying beyond each oven are connected by a flue 45, piercing the middle flue-chamber 22 transversely, as shown in Fig. 6. The communication between the smoke-passage 42 and the chimney is controlled by a sliding damper 46, located in a plane below the upper walls of the ovens and a suitable distance below a comparatively large upper damper 47, controlling the communication between one end of the smoke-chamber 18 and the chimney. (See Figs. 5 and 6.)

While an extended description of the hot-air currents at this time would be premature, it may be noted that by manipulating the dampers 37 the products of combustion from the fire-boxes may be caused to pass over the ovens, or both over and under the ovens, to the passage 42 and thence out by way of the lower damper 46, or by closing the dampers 36 and 37 such products may be caused to escape over the ovens, past the dampers 17, and into the smoke-chamber 18 and thence to the chimney past the damper 47.

The provision for a circulation of the products of combustion entirely around the ovens and out by way of the lower damper is intended to facilitate baking, while the direct escape of the products from the top of the stove to the smoke-chamber and out by way of the damper 47 is intended more particularly for summer cooking, at which time it is not desired to use the apparatus as a heater. It has been pointed out that in each of the tube-chambers 21, 22, and 23 there are located direct tubes or flues 29, above which are arranged return tubes or flues 31; but it will be noted that these several sets of tubes are utilized only when the doors 33 of the front smoke-chambers 28 are opened. The tubes described are utilized only when it is desired to generate steam to heat the water in the boiler to a high degree—as, for instance, in winter—when steam or hot-water heating systems are to be fed. It is sometimes desired, however, to heat the water in the boiler to a moderate degree only, and I therefore provide an additional set of tubes opening into the rear end of each of the compartments in which the fire-boxes and ovens are located. In Fig. 2 of the drawings and also in Figs. 4 and 5 are shown direct tubes 48, located within the vertical chamber 20 of the boiler directly back of the upper stove-flues 49 and having their ends set in the walls 27 and 30.

Above each set of direct tubes 48 is disposed a series of return-tubes 50, which latter, like the return-tubes 31, are set in the walls 27 and 30 and open out at their front ends into the smoke-chamber 18. Thus it will be seen that when the doors of the front smoke-chambers 28 and the lower damper 46 are closed the products of combustion will pass back over the ovens through the flues 49, and if the dampers 17 at the bottom of the smoke-chamber 18 are also closed said products will pass through the direct tubes 48, thence to the smoke-chamber, through the return-tubes 50, and out to the chimney by way of the damper 47. This last-described circulation is particularly convenient in summer, when it is desired to employ the stove for cooking and also for heating water, as the two sets of tubes at the rear ends of the flues 49 will be of just sufficient capacity to heat the water without raising it to that exceedingly high temperature which is necessary when the apparatus is used in connection with the heating system in winter.

When the apparatus is operating under winter conditions, the dampers 46, 37, and 17 are all closed and the damper 47 at the end of the smoke-chamber 18 and the doors 33 of the front smoke-chambers are opened. The products of combustion from the fire-boxes will then pass into the front smoke-chambers 28, thence rearwardly through the direct tubes 29, extending within the boiler nearly the full length thereof, and will also pass rearwardly through the flues 49 and direct tubes 48, returning through the return-tubes 31 and 50 to the smoke-chamber and out past the damper 47. This is the circulation which is designed for use when the apparatus is employed as a steam-generator or hot-water heater for heating systems, and as the top of the stove will be kept sufficiently hot for cooking it will be obvious that an additional expenditure of fuel for cooking purposes will be unnecessary.

In order to further facilitate the uniform heating of the ovens, it is desired to provide for the circulation of the products of combustion around the sides thereof, and I therefore employ what may be termed "conductors" 51, constituting the side walls of the ovens, each of said conductors comprising a pair of plates 52 and 53, spaced apart to form an intermediate flue 54, open at its top. (See Fig. 5.) These conductors rest upon the top walls 39 of the horizontal boiler-chamber 19, and their inner plates 53 are formed at their lower edges with openings 55, which permit the products of combustion passing downwardly through said conductors to escape into the flue 40, whence they may escape rearwardly to the smoke-passage 42 and thence to the chimney. The conductors 51 preferably, though not necessarily, also extend along the opposite sides of the fire-boxes 34 and are preferably provided with ribs 56 for the support of the bottom walls 38. The circulation through the conductors is controlled by elongated dampers 57. (See Figs. 2 and 5.)

Within the fire-boxes the usual grate-bars 58 are mounted just above the openings 7 in the ash-pits, and access to the ovens is obtained through oven-doors 59 and 60, controlling suitably-housed openings 61, extending into the outer sides of the ovens from the exterior of the casing. (See Figs. 1 and 5.) The equipment of the apparatus is completed by the provision of water-gages 62, located in front of the smoke-chamber 18, steam-gages 63, and safety-valves 64, the steam-gages and the casings of the safety-valves being in communication with the extreme upper end of the boiler-chamber 20, which constitutes the steam-dome of the boiler.

The operation of the device is as follows: When the apparatus is designed to be employed exclusively for baking, the dampers 37, 57, and 46 are opened, all other dampers and the doors 33 being closed. The products of combustion from the fire-boxes will now pass over the ovens to the smoke-passage 42, down through the flues 36, and under the ovens to the smoke-passage, and also around the sides of the ovens through the conductors 51. If now, instead of baking, it is desired to employ the apparatus merely for cooking purposes, the dampers 37, 57, and 46 are closed and the dampers 17 and 47 are opened. The products of combustion will now pass back through the flues 49, heating the top of the stove and escaping through the smoke-chamber 18 to the chimney. Should it be desired to also utilize the products of combustion for the moderate heating of the water in the boiler, the dampers 17 are closed and the products are forced to escape by way of the direct tubes 49, thence through the return-tubes 50 to the smoke-chamber 18 and out at the chimney. If, however, it is desired to raise the temperature of the water in the boiler sufficiently to supply a hot-water heating system or to generate steam for a steam-heating system, the doors 33 into the front smoke-chambers 28 will be opened, and the products of combustion will be forced to pass through all of the direct tubes, including the tubes 29 in the tube-chambers 21, 22, and 23. Access to the various tubes is gained by means of the doors 3 at the back of the casing, and for purposes of cleaning and repair the front smoke-chambers 28 are provided with doors 32, and the rear or main smoke-chamber 18 is provided with similar doors 66.

It should be noted that the peculiar construction and arrangement of my combined cooking and heating apparatus renders it particularly applicable for the equipment of large buildings, such as hotels or the like, inasmuch as it may be located in an outbuilding and connected by suitable piping with the heating system of the hotel, and thus permit the economical use of bituminous or other cheap grades of fuel without the annoyance which would be incident to the consumption of such fuel in heating devices located in the main building. Special attention is also called to the fact that the provision for the various changes of circulation of the products of combustion in accordance with the conditions under which the apparatus is operating results in a vast economy of fuel over ordinary appliances of this character.

It is thought that from the foregoing the construction and operation of my combined cooking-stove and steam-generator will be clearly apparent; but while the present embodiment of the invention is thought at this time to be preferable I do not limit myself to the structural details defined, as, on the contrary, I reserve the right to effect such changes, modifications, and variations of the illustrated structure as may be comprehended within the scope of the protection prayed.

What I claim is—

1. In a combined cooking-stove and generator, the combination with a casing, of a fire-box located therein, a boiler-chamber in rear of the fire-box, an oven intermediate of the fire-box and boiler-chamber, a flue extending lengthwise of the oven from the fire-box, a smoke-chamber in communication with the chimney and located above the casing in front of the boiler-chamber, horizontal direct and return tubes located in the boiler-chamber, and means for compelling the products of combustion to pass through the tubes to the smoke-chamber or for permitting said products to pass directly to said smoke-chamber from the rear end of the flue.

2. In a combined cooking-stove and generator, the combination with a casing, of a fire-box therein, a boiler-chamber in rear of the fire-box, an oven located intermediate of the fire-box and boiler-chamber, a smoke-chamber in communication with the chimney and located above the casing in front of the boiler-chamber, a flue leading rearwardly from the fire-box and over the oven, direct tubes located in the boiler and communicating with the rear end of said flue, return-tubes located in the boiler and communicating with the smoke-chamber, a damper located above the rear end of the oven to control the direct communication between the flue and the smoke-chamber, and a second damper controlling the escape of the products of combustion from the smoke-chamber.

3. In a combined cooking-stove and generator, the combination with a casing, of a fire-box, an oven and a boiler therein, said boiler comprising a vertical boiler-chamber in rear of the oven and a horizontal chamber extended under the oven and fire-box, direct and return tubes passed through the vertical chamber to lead the products of combustion therethrough, a smoke-chamber in communication with the return-tubes, a damper controlling the direct communication of the products of combustion with said smoke-chamber, and a damper controlling the escape of the products of combustion from said chamber.

4. In a combined cooking-stove and generator, the combination with a casing, of a fire-box, an oven and a boiler therein, said boiler comprising a vertical boiler-chamber located in rear of the oven and a horizontal boiler-chamber extended under the oven and fire-box, direct and return tubes extending through the vertical chamber of the boiler, a smoke-chamber located above the top wall of the stove and in communication with the return-tubes of the boiler, a damper located in the bottom of the smoke-chamber to control the direct passage of the products of combustion thereto, and another damper located at one end of the smoke-chamber to control the escape of the products of combustion to the chimney.

5. In a combined cooking-stove and generator, the combination with a casing, of a fire-box, an oven and a boiler therein, said boiler comprising a vertical boiler-chamber located in rear of the oven and a horizontal boiler-chamber extended under the oven and fire-box, a smoke-chamber located above the top wall of the stove, direct and return tubes extending through the boiler, the return-tubes being in communication with the smoke-chamber, dampers in the bottom and one end of the smoke-chamber, a smoke-passage below the top wall of the stove and in direct communication with the chimney, and a damper controlling said smoke-passage, the arrangement of the several dampers permitting the products of combustion to escape directly from the stove to the chimney, or direct to the smoke-chamber, or through the direct and return tubes to the smoke-chamber and thence to the chimney.

6. In a combined cooking-stove and generator, the combination with a casing, of a fire-box, an oven and a boiler therein, said boiler comprising a vertical boiler-chamber located in rear of the oven and a horizontal boiler-chamber extended under the oven and fire-box, a smoke-passage at the rear end of the oven, a damper controlling the communication between said smoke-passage and the chimney, direct and return tubes extended through the vertical chamber of the boiler to lead the products of combustion therethrough, a smoke-chamber in communication with the return-tubes, a damper controlling the direct communication between the stove and the smoke-chamber, and a damper controlling the escape of the products of combustion from the smoke-chamber.

7. In a combined cooking-stove and generator, the combination with a casing, of a fire-box, an oven and a boiler therein, said boiler comprising a vertical boiler-chamber located in rear of the oven and a horizontal boiler-chamber extended under the oven and fire-box, a smoke-passage in rear of the oven, flues located above and below the oven and communicating with the smoke-passage, a damper controlling the passage of the products of combustion through the lower flue, a damper controlling the escape of the products of combustion from the smoke-passage, and tubes extending through the boiler to lead the products of combustion therethrough.

8. In a combined cooking-stove and generator, the combination with a casing, of a fire-box, an oven and a boiler therein, said boiler comprising a vertical boiler-chamber located in rear of the oven and a horizontal boiler-chamber extended under the oven and fire-box, a smoke-passage in rear of the oven, flues located above and below the oven and communicating with the smoke-passage, a damper controlling the passage of the products of combustion through the lower flue, a damper controlling the escape of the products of combustion from the smoke-passage, direct and return tubes located within the boiler, a smoke-chamber communicating with the return-tubes, and a damper controlling the direct communication between the smoke-chamber and the flue above the oven.

9. In a combined cooking-stove and generator, the combination with a stove-casing, of a boiler located therein and comprising longitudinal tube-chambers and tubes located therein, of a smoke-chamber arranged to receive the products of combustion from said tubes, front smoke-chambers in communication with the front ends of the tubes, a fire-box and an oven located between the longitudinal tube-chambers of the boiler, and doors controlling the passage of the products of combustion from the fire-box to the front smoke-chambers.

10. In a combined cooking-stove and generator, the combination with the stove-casing, of a boiler located therein and comprising a horizontal boiler-chamber and longitudinal tube-chambers upstanding from and in communication with the horizontal chamber, tubes located within the tube-chambers, a smoke-chamber disposed to receive the products of combustion from said tubes, front smoke-chambers in communication with the tubes in the tube-chambers, a fire-box and an oven located between the tube-chambers, doors controlling the escape of the products of combustion from the fire-box to the front smoke-chambers, a smoke-passage in rear of the oven, a damper controlling the escape of the products from said passage, flues located above and below the oven and communicating with the smoke-passage, a vertical flue located at the front end of the oven to lead the products of combustion from the fire-box to the lower flue, and a damper controlling said vertical flue.

11. In a combined cooking-stove and generator, the combination with a stove-casing, of a boiler located therein and comprising a vertical boiler-chamber, a horizontal chamber extending forwardly therefrom and longitudinally-disposed tube-chambers in communication with both the horizontal and vertical chambers, direct tubes located within the tube-chambers and extended through the vertical chamber of the boiler, front smoke-chambers in communication with the front ends of said tubes, other direct tubes extending through the vertical chamber of the boiler between the tube-chambers thereof, a smoke-chamber located above the top wall of the stove, return-tubes extending through the vertical boiler-chamber and opening into the smoke-chamber, a fire-box and an oven located between the tube-chambers and above the horizontal chamber of the boiler, doors controlling the passage of the products of combustion from the fire-box to the front smoke-chambers, a damper controlling the direct escape of the products of combustion from the stove to the rear smoke-chamber, and a damper controlling the escape of the products of combustion from the rear smoke-chamber to the chimney.

12. In a combined cooking-stove and generator, the combination with a stove-casing having a vertical extension at the rear end thereof, of a boiler located within the casing and comprising a horizontal chamber, a vertical chamber at the rear end of the horizontal chamber and extended into the casing extension and parallel tube-chambers located above the horizontal boiler-chamber and in front of the vertical boiler-chamber, a fire-box and an oven disposed between the tube-chambers, a smoke-passage in rear of the oven, a damper controlling said passage, upper and lower flues located above and below the oven and leading to the smoke-passage, a vertical flue extending between the upper and lower flues at the end of the oven, a damper controlling the vertical flue, front smoke-chambers located at the front ends of the tube-chambers, direct tubes communicating with the front smoke-chambers and extending rearwardly through the tube-chambers and through the vertical chamber of the boiler, doors controlling the passage of the products of combustion from the fire-box to the front smoke-chambers, a rear smoke-chamber located in front of the casing extension, return-tubes extending through the vertical boiler-chamber and communicating with the rear smoke-chamber, a damper located in the bottom of the smoke-chamber, and another damper located at the end of the rear smoke-chamber.

13. In a combined cooking-stove and generator, the combination with a casing having a vertical extension at its rear end, and a rear smoke-chamber in front of said extension, of a boiler within the casing, said boiler comprising a vertical chamber extended upwardly into the casing extension, a horizontal chamber leading forwardly from the vertical chamber and three longitudinal tube-chambers located, respectively, at the opposite sides and at the middle of the casing and communicating with the horizontal boiler-chamber, fire-boxes and ovens located in the compartments defined between the tube-chambers of the boiler, direct tubes passed through the vertical boiler-chamber in rear of each oven, other direct tubes extending lengthwise through the tube-chambers and through the vertical boiler-chamber, return-tubes located within the upper end of the vertical chamber and opening into the rear smoke-chamber, front smoke-chambers located in the front ends of the tube-chambers and in communication with the tubes therein, doors located at opposite sides of the fire-boxes and above the same and controlling the passage of the products of combustion into the front smoke-chambers, a smoke-passage disposed in rear of both ovens to convey the products of combustion to the chimney, a lower damper controlling the smoke-passage, an upper damper controlling the communication between the rear smoke-chamber and the chimney, and dampers located in the bottom of the rear smoke-chamber above each of the ovens, said boiler being equipped with water and steam gages and safety-valves.

14. In a device of the character described, the combination with a casing, of a fire-box and oven therein, a smoke-passage located in rear of the oven, upper and lower flues located above and below the oven and extending to the smoke-passage, a vertical flue located at the front end of the oven and establishing communication between the upper and lower flues, a damper controlling the vertical flue, side flues located at opposite sides of the oven and communicating with the lower flue, and dampers controlling the side flues.

15. In a device of the character described, the combination with a casing, of a pair of hollow conductors therein, a fire-box and an oven located between said conductors and having a common bottom wall supported thereby, said conductors being provided with openings permitting the passage of the products of combustion under the oven, and dampers controlling the passage of the products of combustion through the conductors.

In testimony that I claim the foregoing as my own I have hereto affixed my signature in the presence of two witnesses.

DAVID CLINE.

Witnesses:
MARGARET SIMMONS,
CHARELLA SNODDY.